United States Patent
Oda (10) Patent No.: US 9,751,217 B2
(45) Date of Patent: Sep. 5, 2017

(54) ROBOT HAND FOR TRANSPORTING ARTICLE, ROBOT AND ROBOT SYSTEM PROVIDED WITH ROBOT HAND, AND METHOD FOR CONTROLLING ROBOT HAND

(71) Applicant: FANUC Corporation, Yamanashi (JP)

(72) Inventor: Masaru Oda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/312,811

(22) Filed: Jun. 24, 2014

(65) Prior Publication Data
US 2015/0000453 A1   Jan. 1, 2015

(30) Foreign Application Priority Data

Jun. 26, 2013  (JP) .................................. 2013-134240

(51) Int. Cl.
*B25J 19/00* (2006.01)
*B25J 18/02* (2006.01)

(52) U.S. Cl.
CPC ............. *B25J 19/002* (2013.01); *B25J 18/02* (2013.01); *Y10S 901/22* (2013.01); *Y10T 74/20305* (2015.01)

(58) Field of Classification Search
CPC ..................................................... B25J 19/002
USPC .................. 74/490.01; 248/123.11; 212/197; 414/673; 901/48
See application file for complete search history.

(56) References Cited

U.S. PATENT DOCUMENTS

| 3,710,956 | A  | * | 1/1973  | Meyer et al. .................. 414/239 |
| 4,907,768 | A  | * | 3/1990  | Masseron ............. B66F 11/048 212/197 |
| 8,491,250 | B2 | * | 7/2013  | Zhang et al. .................. 414/673 |
| 2011/0278252 | A1 | * | 11/2011 | De Carvalho Cal ... B66C 23/72 212/279 |

FOREIGN PATENT DOCUMENTS

| FR | 2 9985 448 | * | 7/2013 |
| JP | 62-213980 A |   | 9/1987 |
| JP | 2-232193 | * | 9/1990 |

(Continued)

OTHER PUBLICATIONS

Machine Translation of FR 2 985 448; Inventor: Garnier; Published Jul. 2013.*

*Primary Examiner* — William C Joyce
(74) *Attorney, Agent, or Firm* — Hauptman Ham, LLP (57) ABSTRACT

A robot hand capable of reducing the load moment applied on the wrist of the robot hand in lifting an article includes a base, a first hand arm, and a second hand arm. The first hand arm is mounted on the base, includes a holding part configured to hold the article, and is configured such that the holding part is movable between a first distal position away from the base in a first direction, and a first proximal position close to the base more than the first distal position. The second hand arm is mounted on the base, includes a counter balancer weight, and is configured such that the counter balancer weight is movable between a second distal position away from the base in a second direction opposite to the first direction, and a second proximal position close to the base more than the second distal position.

8 Claims, 10 Drawing Sheets

(56) References Cited

FOREIGN PATENT DOCUMENTS

| JP | 2002-172569 A | | 6/2002 |
|----|---------------|---|--------|
| JP | 2004-71925 A | | 3/2004 |
| JP | 2006-016144 A | | 1/2006 |
| SU | 1293017 | * | 2/1987 |
| SU | 1308463 | * | 5/1987 |

* cited by examiner

ROBOT HAND FOR TRANSPORTING ARTICLE, ROBOT AND ROBOT SYSTEM PROVIDED WITH ROBOT HAND, AND METHOD FOR CONTROLLING ROBOT HAND

RELATED APPLICATIONS

The present application claims priority to Japanese Application Number 2013-134240, filed Jun. 26, 2013, the disclosure of which is hereby incorporated by reference herein in its entirety.

BACKGROUND ART

1. Technical Field

The present invention relates to a robot hand for holding and transporting an article, a robot and a robot system provided with a robot hand, and a method for controlling a robot hand.

2. Description of the Related Art

In the field of industrial robots, there is known a robot provided with a robot hand including a linearly reciprocable holding part for holding an article such as a workpiece (see e.g. Japanese Laid-open Patent Publication No. 2002-172569 and Japanese Laid-open Patent Publication No. 2006-16144).

A conventional robot hand, which includes a linearly reciprocable holding part, is mounted on a wrist disposed at the distal end of a robot arm at a base of the robot hand functioning as a supporting point. When the robot hand holds an article placed at a position away from the wrist, the robot hand moves the holding part toward the article, and then holds and lifts the article by the holding part which is disposed at a position away from the base.

At this time, a load moment depending on the distance between the holding part for holding the article and the base, and on the weight of the article is applied on the base and the wrist. In a robot hand including a linearly reciprocable holding part, it is necessary to reduce the load moment applied on the base and the wrist when the holding part disposed at a position away from the base lifts the article.

Further, in the configuration in which a robot hand including a linearly reciprocable holding part is attached to a robot arm, the load inertia is applied on the robot arm when transporting the article held by the holding part by the operation of the robot arm. It is also necessary to reduce the load inertia applied on the robot arm.

SUMMARY OF THE INVENTION

According to an aspect of the present invention, a robot hand is configured to hold and transport an article. The robot hand is provided with a base; a first hand arm mounted on the base, including a holding part configured to hold the article, and being able to move the holding part between a first distal position away from the base in a first direction, and a first proximal position closer to the base than the first distal position; and a second hand arm mounted on the base, including a counter balancer weight, and being able to move the counter balancer weight between a second distal position away from the base in a second direction opposite to the first direction, and a second proximal position closer to the base than the second distal position.

The robot hand may be further provided with a first driving unit configured to drive the holding part to move between the first distal position and the first proximal position; and a second driving unit configured to drive the counter balancer weight to move between the second distal position and the second proximal position.

The robot hand may be further provided with a link mechanism configured to link movement of the holding part by the first driving unit, and movement of the counter balancer weight by the second driving unit. In this configuration, the first driving unit and the second driving unit may include a common power source.

Each of the first driving unit and the second driving unit may include an air cylinder. Alternatively, each of the first driving unit and the second driving unit may include a servo motor. Alternatively, one of the first driving unit and the second driving unit may include a servo motor, and the other of the first driving unit and the second driving unit may include an air cylinder.

According to another aspect of the present invention, a robot is provided with the robot hand having the above configuration, and a robot arm to which the robot hand is mounted.

According to yet another aspect of the present invention, a robot system is provided with the above robot, and a controller configured to control the robot. The robot system may be further provided with a load sensor configured to measure a weight of the article. The controller may control movement of the counter balancer weight by the second hand arm, based on the weight of the article measured by the load sensor.

According to still another aspect of the present invention, a method for controlling the above robot hand comprises moving the counter balancer weight from the second proximal position to the second distal position by the second hand arm; moving the holding part from the first proximal position to the first distal position by the first hand arm; and holding the article by driving the holding part.

The method may comprise measuring a weight of the article, after holding the article; calculating an arrangement position at which the counter balancer weight is to be arranged, based on the measured weight of the article; and moving the counter balancer weight to the arrangement position by the second hand arm.

BRIEF DESCRIPTION OF THE DRAWINGS

These and other objects, features, and advantages of the present invention will become more apparent upon reading the following detailed description along with the accompanying drawings, in which.

DETAILED DESCRIPTION

In the following, embodiments of the present invention are described in detailed based on the drawings. Firstly, a configuration of a robot system 10 according to an embodiment of the present invention is described referring to FIG. 1. The robot system 10 comprises a robot 11 configured to hold and transport an article W such as a workpiece; and a controller 12 configured to control the robot 11.

Figure 1:
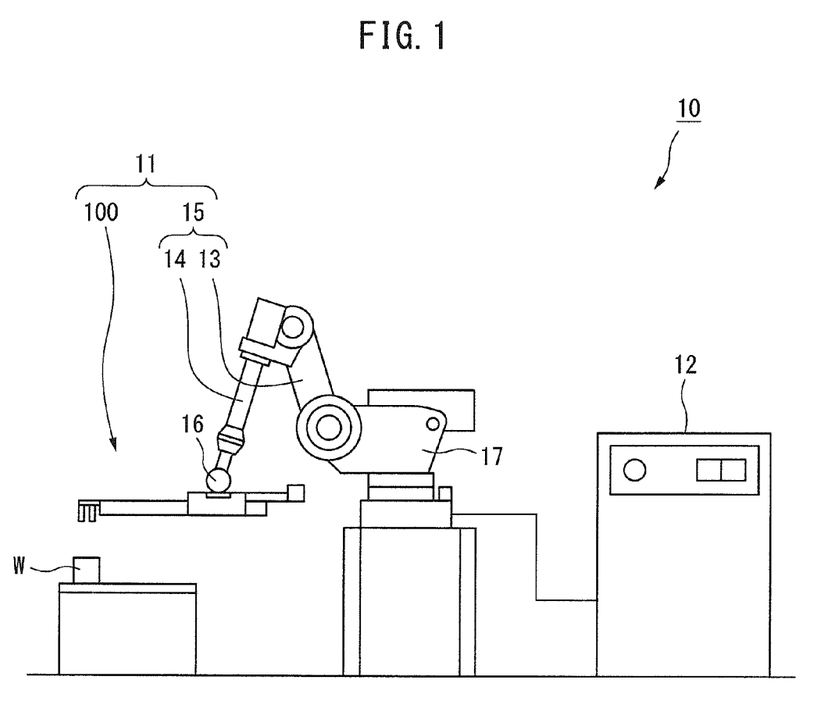
FIG. 1 is a schematic diagram of a robot system according to an embodiment of the present invention.

The robot 11 according to the embodiment is a vertical articulated robot including a plurality of axes. Specifically, the robot 11 comprises a robot arm 15 including a lower arm 13 mounted on a turning trunk 17, and a front arm 14 mounted on the lower arm 13; and a robot hand 100 mounted on a wrist 16 at the distal end of the robot arm 15.

Figure 2:
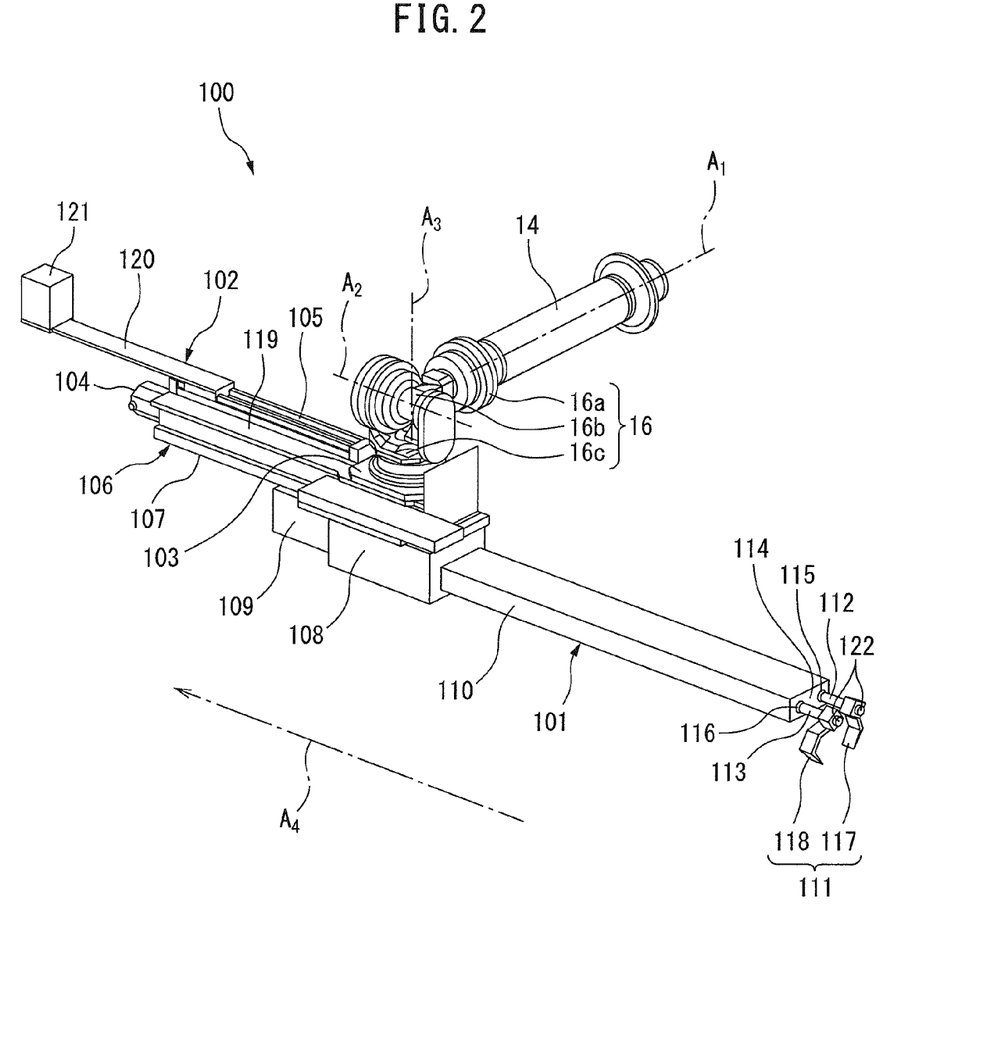
FIG. 2 is a perspective view of a robot hand according to an embodiment of the present invention, and is a diagram illustrating a state that the robot hand is extended.

Next, referring to FIG. 2, a configuration of the robot hand 100 according to the embodiment is described. The robot hand 100 comprises a base 103 mounted on the wrist 16 of the front arm 14; a first hand arm 101 and a second hand arm 102 mounted on the base 103; a servo motor 104 configured to drive the first hand arm 101; and an air cylinder 105 configured to drive the second hand arm 102.

In the state illustrated in FIG. 2, the front arm 14 extends along a first axis $A_1$. The base 103 is mounted at the distal end of the front arm 14 via the wrist 16 including a first wrist member 16a, a second wrist member 16b, and a third wrist member 16c, so as to be rotatable around the first axis $A_1$, a second axis $A_2$, and a third axis $A_3$. The second axis $A_2$ is orthogonal to the first axis $A_1$ and rotates around the first axis $A_1$. The third axis $A_3$ is orthogonal to the second axis $A_2$ and rotates around the second axis $A_2$.

The base 103 is rotatable around the first axis $A_1$ with respect to the front arm 14, by the first wrist member 16a disposed at one end of the front arm 14 in the first axis $A_1$ direction. Further, the base 103 is rotatable around the second axis $A_2$ with respect to the front arm 14, by the second wrist member 16b disposed at one side of the first wrist member 16a in the first axis $A_1$ direction. Further, the base 103 is rotatable around the third axis $A_3$ with respect to the front arm 14, by the third wrist member 16c disposed at one side of the second wrist member 16b in the third axis $A_3$ direction.

A ball screw housing 106 extending from the base 103 in the fourth axis $A_4$ positive direction (in a direction indicated by the arrow of the fourth axis $A_4$ in FIG. 2) is fixed on one side of the base 103 in the third axis $A_3$ direction. The fourth axis $A_4$ rotates around the first axis $A_1$, the second axis $A_2$, and the third axis $A_3$.

The ball screw housing 106 is a hollow box-shaped member having a square cross section, the longitudinal direction of which is aligned in the fourth axis $A_4$ direction. A ball screw (not illustrated) including a screw shaft extending along the fourth axis $A_4$ is housed in the internal space of the ball screw housing 106. The fourth axis $A_4$ positive direction end of the screw shaft of the ball screw is connected to an output shaft (not illustrated) of the servo motor 104. An opening (not illustrated) extending along the fourth axis $A_4$ is formed in an end surface 107 of the ball screw housing 106.

The first hand arm 101 includes a connection part housing 108 mounted to face the end surface 107 of the ball screw housing 106; a motor housing 109 fixed on the fourth axis $A_4$ positive direction side of the connection part housing 108; a shaft housing 110 extending from the connection part housing 108 in the fourth axis $A_4$ negative direction; and a holding part 111 disposed on the fourth axis $A_4$ negative direction side of the shaft housing 110. The connection part housing 108 is a hollow box-shaped member, and includes a connection part (not illustrated) in the internal space thereof, the connection part being connected to the ball screw housing 106.

The connection part engages the screw shaft through the opening formed in the end surface 107 of the ball screw housing 106, and is supported by the ball screw housing 106 so as to be movable in the fourth axis $A_4$ direction. In the embodiment, rotational movement of the screw shaft is converted to movement of the connection part housing 108 along the fourth axis $A_4$. Specifically, when the screw shaft is rotated around the fourth axis $A_4$ in one direction, the connection part engaging the screw shaft is driven in the fourth axis $A_4$ negative direction.

With this movement of the connection part, the connection part housing 108 is moved in the fourth axis $A_4$ negative direction. Similarly, when the screw shaft is rotated around the fourth axis $A_4$ in the other direction, the connection part is driven in the fourth axis $A_4$ positive direction, and as a result, the connection part housing 108 is moved in the fourth axis $A_4$ positive direction. In this way, the connection part housing 108 reciprocates along the fourth axis $A_4$, as the screw shaft is rotated.

The motor housing 109 is a hollow box-shaped member, and houses a motor (not illustrated) configured to drive the holding part 111 in the internal space thereof. The shaft housing 110 is a hollow box-shaped member, and houses a first shaft 112 and a second shaft 113 extending along the fourth axis $A_4$ in the internal space thereof. The fourth axis $A_4$ positive direction ends of two shafts 112 and 113 are mechanically connected to the output shaft of the motor housed in the motor housing 109 via a gear mechanism.

When the output shaft of the motor is rotated, the first shaft 112 and the second shaft 113 are rotated around the fourth axis $A_4$ in directions opposite to each other by the gear mechanism. The first shaft 112 and the second shaft 113 respectively extend from the fourth axis $A_4$ positive direction ends thereof in the fourth axis $A_4$ negative direction, pass through the internal spaces of the connection part housing 108 and the shaft housing 110, and extend to the outside via a first through-hole 115 and a second through-hole 116 formed at a fourth axis $A_4$ negative direction end surface 114 of the shaft housing 110.

The holding part 111 is mounted on the distal ends of the first shaft 112 and the second shaft 113. More specifically, the holding part 111 includes a first claw 117 fixed on the first shaft 112, and a second claw 118 fixed on the second shaft 113. The first claw 117 and the second claw 118 are respectively curved outward.

As described above, the shafts 112 and 113 are driven and rotated in directions opposite to each other by the motor housed in the motor housing 109. Therefore, the tips of the claws 117 and 118 are driven in directions toward each other and in directions away from each other. According to this configuration, the holding part 111 can nip and hold the article W by the claws 117 and 118, and also release the held article W.

In the embodiment, a load sensor 122 for measuring the weight of the article W is interposed between the holding part 111, and the shafts 112 and 113. The load sensor 122 acquires information relating to the weight of the article W in response to a command from the controller 12 when the holding part 111 lifts the article W, and transmits the information to the controller 12. The load sensor 122 will be described later.

The air cylinder 105 is fixed on an upper surface 119 of the ball screw housing 106 on the fourth axis $A_4$ positive direction side of the base 103. The air cylinder 105 includes a piston (not illustrated) driven along the fourth axis $A_4$ by an air pressure. When the air pressure in the air cylinder 105 is raised by a compressor (not illustrated) placed outside, the piston is driven in the fourth axis $A_4$ positive direction. On the other hand, when the air pressure in the air cylinder 105 is lowered by the compressor, the piston is driven in the fourth axis $A_4$ negative direction.

The second hand arm 102 includes an arm plate 120 extending along the fourth axis $A_4$; and a counter balancer weight 121 fixed on the arm plate 120. The arm plate 120 is provided so as to be movable along the fourth axis $A_4$ at the upper side of the air cylinder 105. The arm plate 120 is mechanically connected to the piston provided inside of the air cylinder 105. As described above, the piston is driven to reciprocate along the fourth axis $A_4$ by the air pressure in the air cylinder 105. Therefore, the arm plate 120 also reciprocates along the fourth axis $A_4$ together with the piston.

The counter balancer weight 121 is a weight of a quadrangular prismatic shape having a predetermined weight. The counter balancer weight 121 is fixed on the fourth axis $A_4$ positive direction end of the upper surface of the arm plate 120. The counter balancer weight 121 reciprocates along the fourth axis $A_4$ together with the arm plate 120 by the air cylinder 105.

The robot hand 100 illustrated in FIG. 2 is in an extended state capable of holding the article W. In this extended state, the first hand arm 101 of the robot hand 100 arranges the holding part 111 at a first distal position away from the base 103 in the fourth axis $A_4$ positive direction. More specifically, in this state, the connection part housed in the connection part housing 108 is disposed at a position close to the fourth axis $A_4$ negative direction end of the screw shaft in the ball screw housing 106.

As a result, the connection part housing 108 is positioned with respect to the ball screw housing 106 so that the fourth axis $A_4$ negative direction end of the connection part housing 108 is located close to the fourth axis $A_4$ negative direction end of the ball screw housing 106. When the connection part housing 108 is positioned in this way, the holding part 111 fixed on the fourth axis $A_4$ negative direction side of the shaft housing 110 is arranged at the first distal position away from the base 103 in the fourth axis $A_4$ negative direction.

On the other hand, in the extended state illustrated in FIG. 2, the second hand arm 102 of the robot hand 100 arranges the counter balancer weight 121 at a second distal position away from the base 103 in the fourth axis $A_4$ positive direction. More specifically, in a state that the counter balancer weight 121 is arranged at the second distal position, the piston enclosed in the air cylinder 105 has been driven by the air pressure, and disposed at the fourth axis $A_4$ positive direction end of the air cylinder 105.

As a result, the arm plate 120 is positioned with respect to the air cylinder 105 so that the fourth axis $A_4$ negative direction end of the arm plate 120 is located close to the fourth axis $A_4$ positive direction end of the air cylinder 105. When the arm plate 120 is positioned in this way, the counter balancer weight 121 fixed on the fourth axis $A_4$ positive direction end of the arm plate 120 is arranged at the second distal position away from the base 103 in the fourth axis $A_4$ positive direction.

Figure 3:
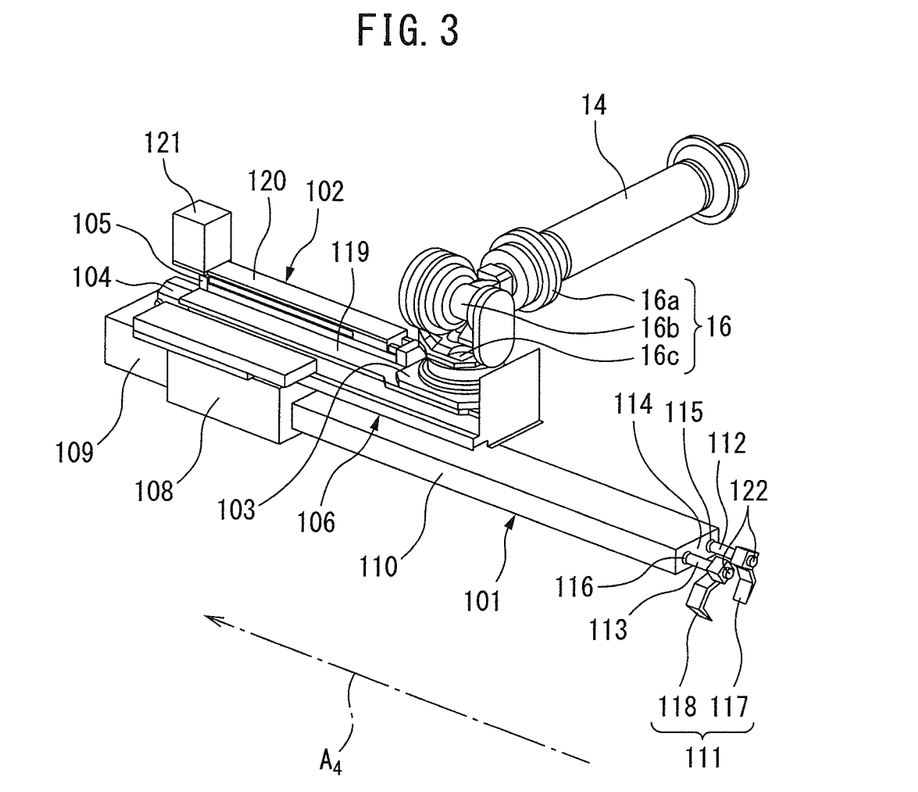
FIG. 3 is a perspective view of the robot hand illustrated in FIG. 2, and is a diagram illustrating a state that the robot hand is contracted.

Next, a contracted state of the robot hand 100 is described referring to FIG. 3. In the contracted state of the robot hand 100, as illustrated in FIG. 3, the first hand arm 101 of the robot hand 100 arranges the holding part 111 at a first proximal position close to the base 103. More specifically, in this state where the holding part 111 is arranged at the first proximal position, the connection part housed in the connection part housing 108 is disposed at a position close to the fourth axis $A_4$ positive direction end of the screw shaft in the ball screw housing 106.

As a result, the connection part housing 108 is positioned with respect to the ball screw housing 106 so that the fourth axis $A_4$ positive direction end of the connection part housing 108 is located close to the fourth axis $A_4$ positive direction end of the ball screw housing 106. When the connection part housing 108 is positioned in this way, the holding part 111 fixed on the shaft housing 110 is arranged at the first proximal position closer to the base 103 than the first distal position. Thus, in the present embodiment, the first hand arm 101 is capable of moving the holding part 111 between the first distal position and the first proximal position closer to the base 103 than the first distal position.

On the other hand, in the contracted state illustrated in FIG. 3, the second hand arm 102 of the robot hand 100 arranges the counter balancer weight 121 at a second proximal position close to the base 103. More specifically, in this state, the piston enclosed in the air cylinder 105 is disposed on the fourth axis $A_4$ negative direction end in the air cylinder 105.

As a result, the arm plate 120 is positioned with respect to the air cylinder 105 so that the fourth axis $A_4$ negative direction end of the arm plate 120 is located close to the fourth axis $A_4$ negative direction end of the air cylinder 105. When the arm plate 120 is positioned in this way, the counter balancer weight 121 fixed on the fourth axis $A_4$ positive direction end of the arm plate 120 is arranged at the second proximal position closer to the base 103 than the second distal position. Thus, in the present embodiment, the second hand arm 102 is capable of moving the counter balancer weight 121 between the second distal position and the second proximal position closer to the base 103 than the second distal position.

Figure 4:
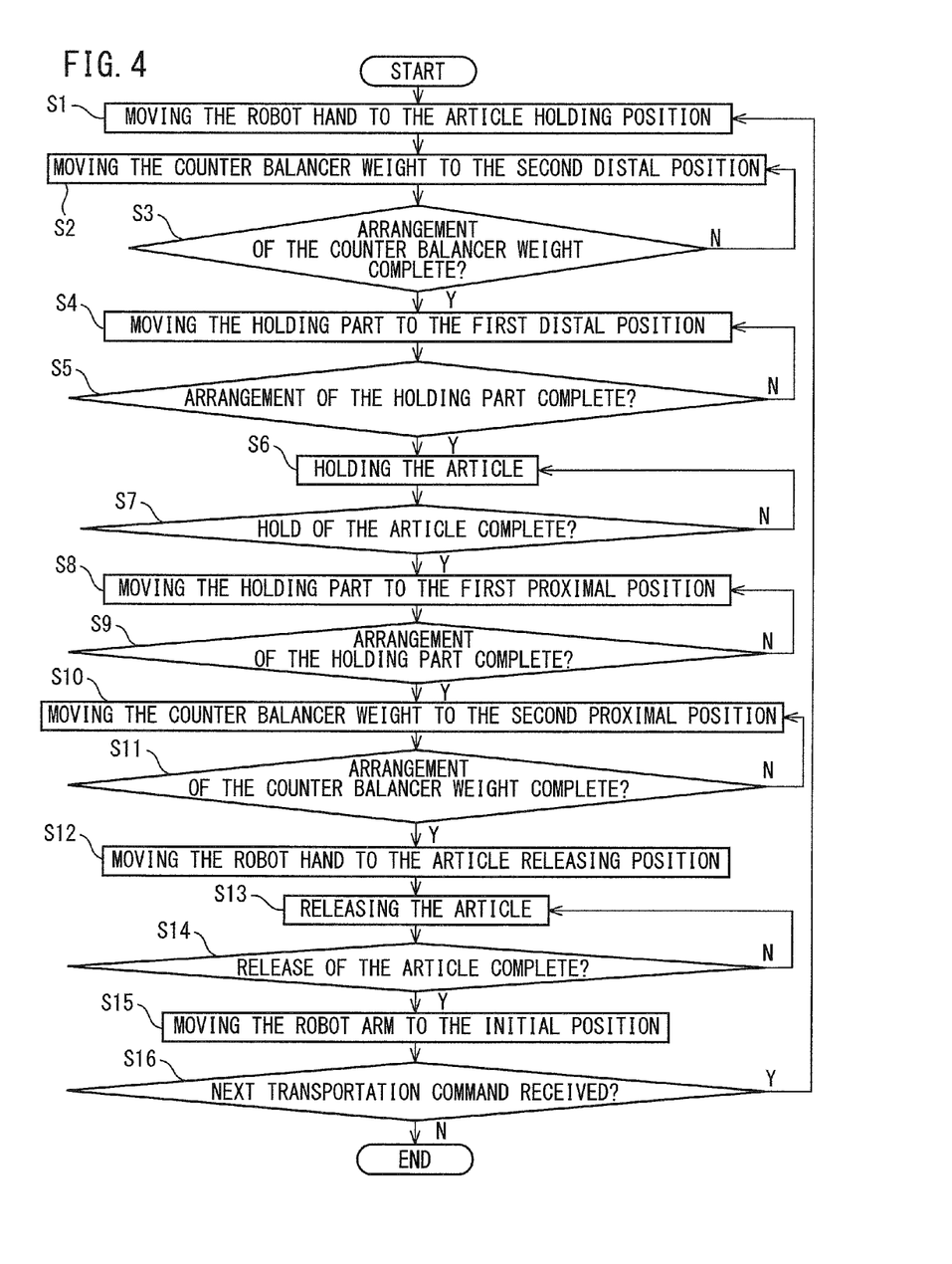
FIG. 4 is a diagram illustrating an example of an operation flow of the robot hand illustrated in FIG. 2.

Next, an operation flow of the robot hand 100 according to the embodiment is described referring to FIG. 4. The operation flow illustrated in FIG. 4 starts when the controller 12 receives a command for transporting the article W from a master controller or an operator.

When receiving a command for transporting the article W, in Step S1, the controller 12 operates the robot arm 15 to move the robot hand 100 to a working position for holding the article W. Specifically, the controller 12 reads out a robot program pre-recorded in a memory built in the controller 12. Then, the controller 12 moves the robot arm 15 in accordance with the robot program so as to arrange the robot hand 100 at a position close to the article W.

In Step S2, the controller 12 moves the counter balancer weight 121 to the second distal position. Specifically, the controller 12 controls the compressor to raise the air pressure in the air cylinder 105. By this operation, the piston in the air cylinder 105 is driven in the fourth axis $A_4$ positive direction, and the arm plate 120 is also moved in the fourth axis $A_4$ positive direction together with the piston. As a result, the counter balancer weight 121 is moved toward the second distal position. Thus, in the present embodiment, the air cylinder 105 functions as a second driving unit configured to move the holding part 111 between the second distal position and the second proximal position.

In Step S3, the controller 12 determines whether the counter balancer weight 121 has been arranged at the second distal position or not. For instance, the controller 12 acquires information relating to a displacement of the arm plate 120 from a position sensor installed in the second hand arm 102 in order to detect the displacement of the arm plate 120, and determines whether the counter balancer weight 121 is arranged at the second distal position, based on the information. When the controller 12 determines "YES," the operation flow proceeds to Step S4. On the other hand, when the controller 12 determines "NO," the operation flow returns to Step S2.

In Step S4, the controller 12 moves the holding part 111 to the first distal position. Specifically, the controller 12 controls the servo motor 104 to rotate the screw shaft of the ball screw housed in the ball screw housing 106. As described above, rotational movement of the screw shaft is converted into movement of the connection part housing 108 along the fourth axis $A_4$.

By this operation, the shaft housing 110, the motor housing 109, and the shafts 112 and 113 fixed on the connection part housing 108 are moved together with the connection part housing 108 in the fourth axis $A_4$ negative direction. As a result, the holding part 111 is moved toward the first distal position. Thus, in the present embodiment, the servo motor 104 and the ball screw function as a first driving unit configured to move the holding part 111 between the first distal position and the first proximal position.

In Step S5, the controller 12 determines whether the holding part 111 has been arranged at the first distal position or not. For instance, the controller 12 determines whether the holding part 111 has been arranged at the first distal position, based on the rotation number of the servo motor 104.

Alternatively, the controller 12 may acquire information relating to a displacement of the connection part from the position sensor for detecting the displacement of the connection part in the connection part housing 108, and determine whether the holding part 111 has been arranged at the first distal position, based on the information. When the controller 12 determines "YES," the operation flow proceeds to Step S6. On the other hand, when the controller 12 determines "NO," the operation flow returns to Step S4.

In Step S6, the controller 12 controls the holding part 111 to hold the article W. Specifically, the controller 12 operates the robot arm 15 to move the holding part 111 to the position of the article W. Then the controller 12 controls the motor housed in the motor housing 109 to rotate the shafts 112 and 113 in directions opposite to each other. As the shafts 112 and 113 are rotated in this way, the claws 117 and 118 are moved in directions toward each other, and hold the article W therebetween.

In Step S7, the controller 12 determines whether the holding part 111 has held the article W or not. For instance, the controller 12 determines whether the holding part 111 holds the article W, based on information from the load sensor 122. When the controller 12 determines "YES," the operation flow proceeds to Step S8. On the other hand, when the controller 12 determines "NO," the operation flow returns to Step S6.

In Step S8, the controller 12 moves the holding part 111 to the first proximal position. Specifically, the controller 12 controls the servo motor 104 to rotate the screw shaft housed in the ball screw housing 106 in a direction opposite to the direction in Step S4. As a result, the holding part 111 is moved toward the first proximal position.

In Step S9, the controller 12 determines whether the holding part 111 has been arranged at the first proximal position or not. When the controller 12 determines "YES," the operation flow proceeds to Step S10. On the other hand, when the controller 12 determines "NO," the operation flow returns to Step S8.

In Step S10, the controller 12 moves the counter balancer weight 121 to the second proximal position. Specifically, the controller 12 controls the compressor to lower the air pressure in the air cylinder 105. By this operation, the piston in the air cylinder 105 is driven in the fourth axis $A_4$ negative direction. As a result, the counter balancer weight 121 is moved toward the second proximal position.

In Step S11, the controller 12 determines whether the counter balancer weight 121 has been arranged at the second proximal position or not. When the controller 12 determines "YES," the operation flow proceeds to Step S12. On the other hand, when the controller 12 determines "NO," the operation flow returns to Step S10.

In Step S12, the controller 12 operates the robot arm 15 to move the robot hand 100 to a working position for releasing the article W. Specifically, the controller 12 reads out the pre-recorded robot program. Then, the controller 12 moves the robot arm 15 in accordance with the robot program so as to dispose the robot hand 100 at a position where to release the article W.

In Step S13, the controller 12 controls the holding part 111 to release the article W. Specifically, the controller 12 firstly operates the robot arm 15 to dispose the holding part 111 at a position where to put the article W. Then, the controller 12 rotates the motor housed in the motor housing 109 in a direction opposite to the direction in Step S6. By this operation, the claws 117 and 118 are moved in directions away from each other. As a result, the article W held by the claws 117 and 118 is released from the holding part 111, and putted on a predetermined target position. Thus, the article W is transported to a predetermined target position.

In Step S14, the controller 12 determines whether the holding part 111 has released the article W or not. For instance, the controller 12 determines whether the holding part 111 has released the article W, based on information from the load sensor 122. When the controller 12 determines "YES," the operation flow proceeds to Step S15. On the other hand, when the controller 12 determines "NO," the operation flow returns to Step S13.

In Step S15, the controller 12 moves the robot arm 15 to the initial position. Specifically, the controller 12 moves the robot arm 15 to the initial position before Step S1 is started.

In Step S16, the controller 12 determines whether the controller 12 has received a next command for transporting another article. When the controller 12 determines "NO," the operation flow is ended. On the other hand, when the controller 12 determines "YES," the operation flow returns to Step S1.

Figure 5:
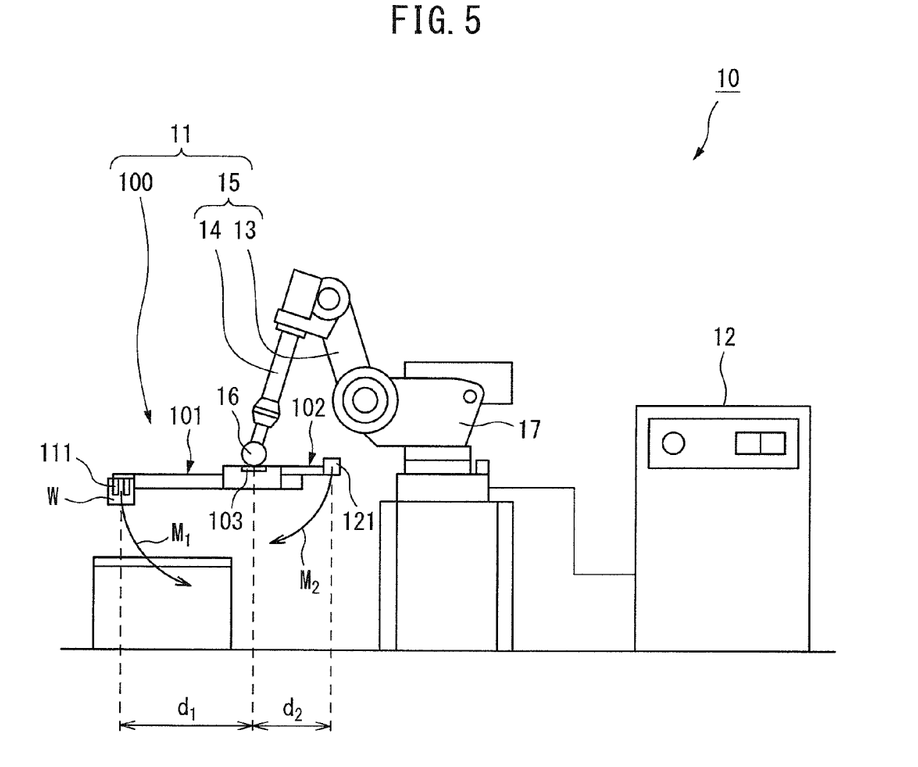
FIG. 5 is a diagram corresponding to FIG. 1, and is a diagram for describing a function of the robot hand.

According to the robot hand 100 of the present embodiment, it is possible to reduce the load applied on the robot arm 15 when transporting the article W. This advantageous effect is described in the following referring to FIG. 5. As illustrated in FIG. 5, when the robot hand 100 lifts the article W by the holding part 111, the load moment $M_1$ derived from the weight of the article W is applied on the wrist 16 provided at the distal end of the robot arm 15 around the base 103, as illustrated by the arrow $M_1$ in FIG. 5. The load moment $M_1$ depends on the distance $d_1$ between the centroid of the article W and the base 103, and on the weight of the article W.

Therefore, when a heavy weight article W is held, or when an article W at a position far away from the base 103 is held, the load moment $M_1$ applied on the wrist 16 may increase. As a result, the load applied on the robot arm 15 may increase.

In view of the above, the robot hand 100 according to the present embodiment is configured such that the counter balancer weight 121 is arranged at the second distal position in order to reduce the load moment $M_1$ by the article W when holding the article W. Specifically, the robot hand 100 arranges the counter balancer weight 121 at the second distal position by the second hand arm 102 in first, and then arranges the holding part 111 at the first distal position by the first hand arm 101, and then holds the article W by the holding part 111.

In this case, the load moment $M_2$ derived from the counter balancer weight 121 is applied on the wrist 16 provided at the distal end of the robot arm 15 around the base 103, as illustrated by the arrow $M_2$ in FIG. 5. The load moment $M_2$ depends on the distance $d_2$ between the centroid of the counter balancer weight 121 and the base 103, and on the weight of the counter balancer weight 121. Since the load moment $M_1$ is reduced by the load moment $M_2$ it is possible to hold a heavy weight article W or an article W far away from the base 103, while reducing the load to the wrist 16 and to the robot arm 15.

Further, as described above, according to the present embodiment, when holding the article W by the holding part 111, the robot hand 100 arranges the counter balancer weight 121 at the second distal position, in first. Next, the robot hand 100 arranges the holding part 111 at the first distal position, as a result of which, the robot hand 100 is brought to an extended state. In addition, after holding and lifting the article W by the holding part 111, the robot hand 100 arranges the holding part 111 at the first proximal position, in first. Next, the robot hand 100 arranges the counter balancer weight 121 at the second proximal position, as a result of which, the robot hand 100 is brought to a contracted state. By extending and contracting the robot hand 100 in such order, it is possible to securely reduce the influence of the load moment $M_1$ applied on the robot arm 15 resulting from lifting the article W.

Further, according to the embodiment, the robot hand 100 is capable of transporting the article W to a target position in a contracted state in which both of the holding part 111 and the counter balancer weight 121 are arranged at the proximal positions. By transporting the article W in a contracted state of the robot hand 100 as described above, it is possible to reduce the load inertia of the robot hand 100 and the article W when transporting. Accordingly, it is possible to transport the article W at a high speed by the robot 11.

Further, according to the embodiment, since the robot hand 100 can transport the article W in a contracted state, it is possible to reduce the area with which the robot hand 100 may interfere during transportation of the article W. This makes it possible to prevent collision of the robot hand 100 with other members at the time of transporting the article W.

Further, according to the embodiment, since the load moment $M_1$ derived from the article W could be reduced, it is possible to stably hold the article W. Therefore, it is possible to prevent vibrations of the robot hand 100 when transporting the article W. This is advantageous in transporting the article W to an intended position with high precision.

Figure 6:
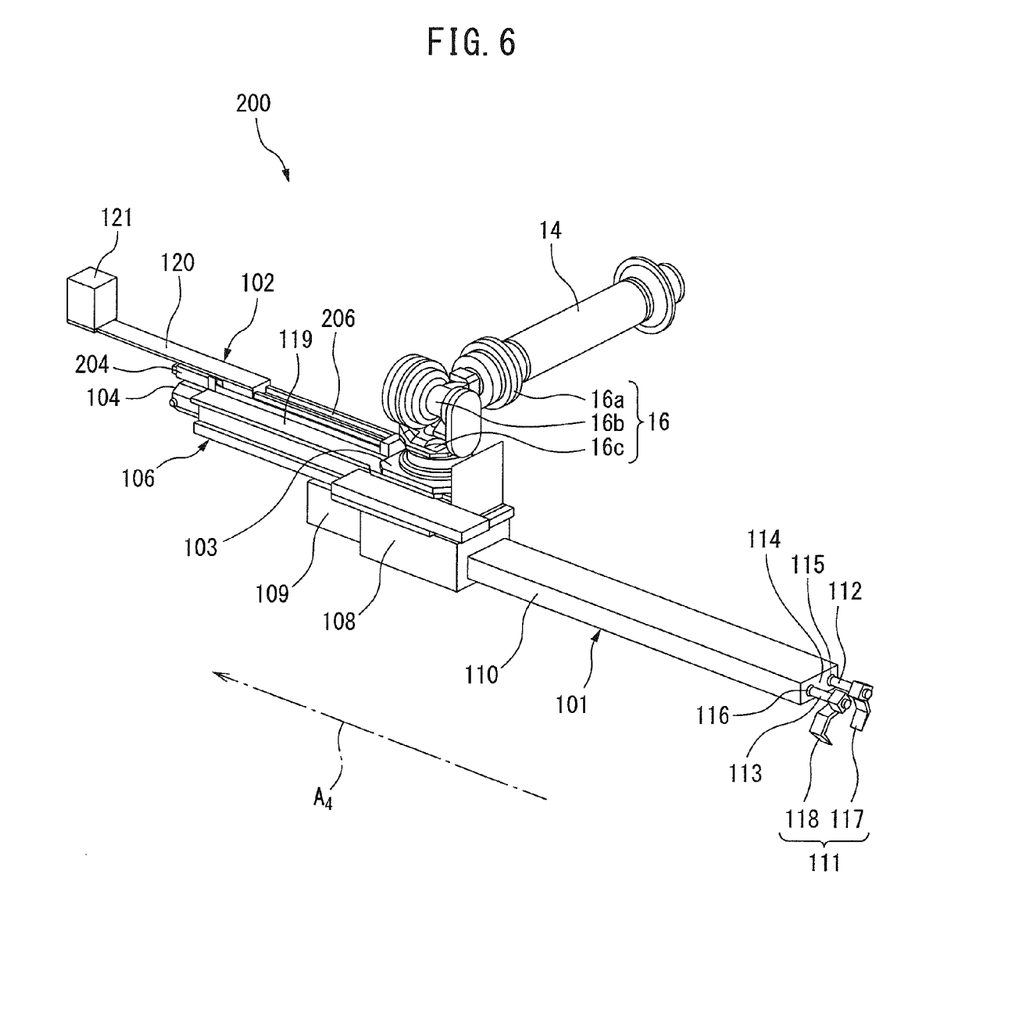
FIG. 6 is a perspective view of a robot hand according to another embodiment of the present invention, and is a diagram illustrating a state that the robot hand is extended.

Next, referring to FIG. 6, a robot hand 200 according to another embodiment of the invention is described. The elements similar to those in the foregoing embodiment are indicated with the same reference numerals, and a detailed description thereof is omitted herein. The robot hand 200 comprises a base 103; a first hand arm 101; a second hand arm 102; a servo motor 104; and a second servo motor 204 configured to drive the second hand arm 102.

In the present embodiment, the second hand arm 102 is driven by the servo motor 204 along the fourth axis $A_4$. More specifically, the robot hand 200 according to the embodiment comprises a second ball screw housing 206 on the fourth axis $A_4$ positive direction side of the base 103. The ball screw housing 206 is fixed on an upper surface 119 of a first ball screw housing 106, and extends from the base 103 in the fourth axis $A_4$ positive direction.

The second ball screw housing 206 is a hollow box-shaped member having a rectangular cross section, the longitudinal direction of which is aligned in the fourth axis $A_4$ direction. A second ball screw including a second screw shaft (not illustrated) extending along the fourth axis $A_4$ is housed in the internal space of the second ball screw housing 206. The fourth axis $A_4$ positive direction end of the second screw shaft is connected to an output shaft (not illustrated) of the servo motor 204.

In the present embodiment, an arm plate 120 of the second hand arm 102 includes a second connection part (not illustrated) mechanically connected to the second ball screw housing 206. The second connection part engages the second screw shaft, and is supported by the second ball screw housing 206 so as to be movable along the fourth axis $A_4$. Rotational movement of the second screw shaft is converted to movement of the arm plate 120 along the fourth axis $A_4$, as same principle as the first hand arm 101 described above.

Specifically, when the second screw shaft is rotated around the fourth axis $A_4$ in one direction, the second connection part engaging the second screw shaft is driven in the fourth axis $A_4$ positive direction. With this movement of the second connection part, the arm plate 120 is also moved in the fourth axis $A_4$ positive direction. Similarly, when the second screw shaft is rotated around the fourth axis $A_4$ in the other direction, the second connection part is driven in the fourth axis $A_4$ negative direction, and as a result, the arm plate 120 is moved in the fourth axis $A_4$ negative direction.

In this way, the arm plate 120 reciprocates along the fourth axis $A_4$, as the second screw shaft is rotated. Thus, in the present embodiment, the second servo motor 204 and the second ball screw function as a second driving unit configured to move the counter balancer weight 121 between the second distal position and the second proximal position.

Figure 7:
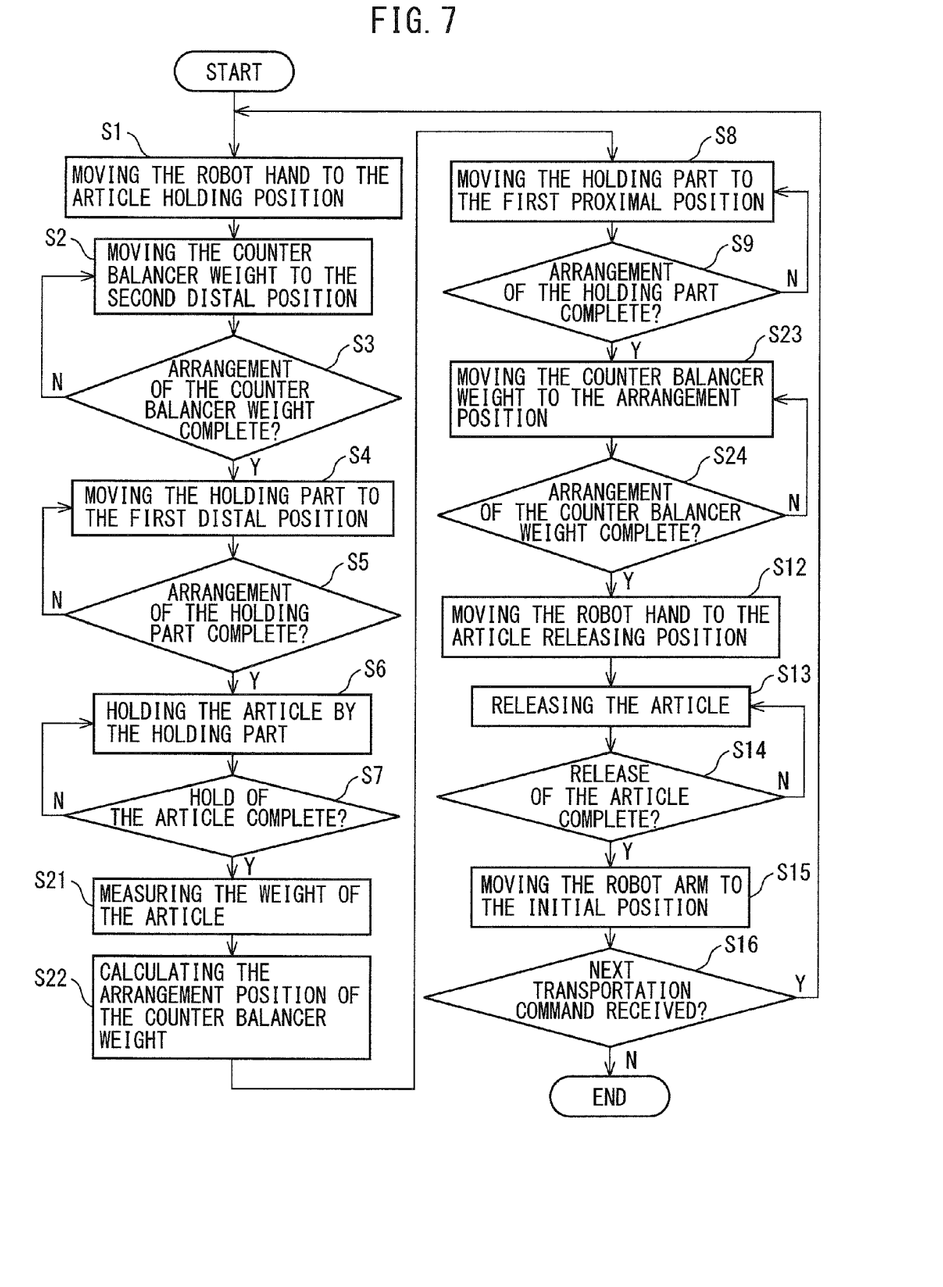
FIG. 7 is a diagram illustrating an example of an operation flow of the robot hand illustrated in FIG. 6.

Next, an operation flow of the robot hand 200 illustrated in FIG. 6 is described referring to FIG. 7. Since Steps S1 to S9, and S12 to S16 illustrated in FIG. 7 are the same as those in the operation flow illustrated in FIG. 4, a detailed description thereof is omitted herein.

In the operation flow of the present embodiment, after Step S7, the controller 12 measures the weight of the article W in Step S21. Specifically, the controller 12 receives information relating to the weight of the article W from the load sensor 122, and records the received information in a memory built in the controller 12.

In Step S22, the controller 12 calculates a position at which the counter balancer weight 121 is to be arranged. Description is made for Step S22 in the following. In a production line, it may be necessary to transport articles W having different weights from each other. In this case, the load moment $M_1$ applied on the robot arm 15 may vary in each of the articles W to be transported. In order to effectively reduce the load moment $M_1$ varying in such a manner by the load moment $M_2$ generated by the counter balancer weight 121, it is necessary to control the distance $d_2$ with respect to each of the articles W.

In view of the above, in the present embodiment, in Step S21, the controller 12 measures the weight of the article W by the load sensor 122, and in step 22, the controller 12 calculates the distance $d_2$ that enables to effectively reduce the load moment $M_1$, based on the measured weight of the article W. As an example, the controller 12 calculates the distance $d_2$ so that the equation: $M_1 d_1^2 \approx M_2 d_2^2$ is satisfied. Then, based on the calculation result of the distance $d_2$, the controller 12 determines a displacement amount by which the second hand arm 102 is to be moved in the fourth axis $A_4$ positive direction.

In the embodiment, robot hand 200 will transport the article W after arranging the holding part 111 at the first proximal position in Step S9. Therefore, in step 22, the controller 12 calculates the distance $d_2$ that enables to reduce the load moment $M_1$ applied on the robot arm 15 by the article W when the holding part 111 is arranged at the first proximal position. After Step S22, the controller 12 proceeds the flow to Step S8.

After Step S9, in Step S23, the controller 12 moves the counter balancer weight 121 to the arrangement position calculated in Step S22. Specifically, the controller 12 drives the second servo motor 204 in accordance with the displacement amount of the second hand arm 102 determined in Step S22, and moves the arm plate 120 of the second hand arm 102 along the fourth axis $A_4$.

In Step S24, the controller 12 determines whether the counter balancer weight 121 has been arranged at a target position. For instance, the controller 12 acquires information relating to a displacement of the arm plate 120 from the position sensor installed in the second hand arm 102 in order to detect the displacement of the arm plate 120, and determines whether the counter balancer weight 121 is arranged at a target position, based on the information. When the controller 12 determines "YES," the operation flow proceeds to Step S12. On the other hand, when the controller 12 determines "NO," the operation flow returns to Step S2, and a loop of Steps S23 to S24 is executed until the counter balancer weight 121 is arranged at a target position.

In this way, according to the embodiment, the controller 12 controls movement of the counter balancer weight 121 based on the weight of the article W measured by the load sensor 122. By this operation, even when the weights of the articles W to be transported differ from each other, it is possible to effectively reduce the load moment $M_1$ applied on the robot arm 15 by the load moment $M_2$ in response to the variation of the load moment $M_1$. Therefore, it is possible to apply the robot hand 200 according to the embodiment to a wider variety of production line, since the robot hand 200 could transport a wider variety of articles.

Further, according to the embodiment, the driving units configured to drive the first hand arm 101 and the second hand arm 102 are constituted by servo motors. This makes it possible to operate the first hand arm 101 and the second hand arm 102 at a high speed. Further, it is possible to synchronize the operation of the first hand arm 101 and second hand arm 102.

Figure 8:
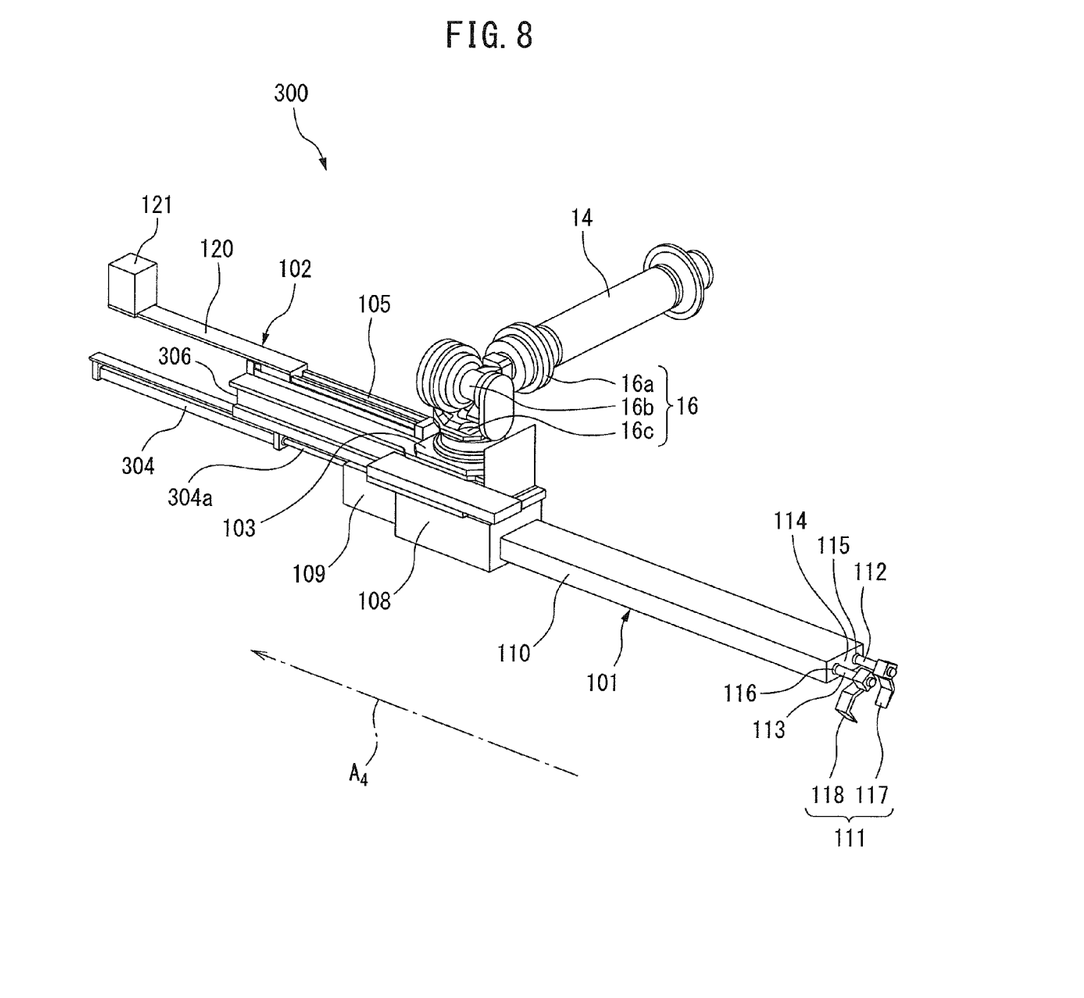
FIG. 8 is a perspective view of a robot hand according to yet another embodiment of the present invention, and is a diagram illustrating a state that the robot hand is extended.

Next, a robot hand 300 according to yet another embodiment of the present invention is described referring to FIG. 8. The elements similar to those in the foregoing embodiments are indicated with the same reference numerals, and a detailed description thereof is omitted herein. The robot hand 300 comprises a base 103; a first hand arm 101; a second hand arm 102; an air cylinder 105; and an air cylinder 304 configured to drive the first hand arm 101.

In the present embodiment, the first hand arm 101 is driven by the air cylinder 304 in the fourth axis $A_4$ negative direction. The air cylinder 304 is fixed on a block 306 extending from the base 103 in the fourth axis $A_4$ positive direction, on the fourth axis $A_4$ positive direction side of a motor housing 109. The air cylinder 304 includes a second piston (not illustrated) disposed in the air cylinder 304, and a cylinder shaft 304a fixed on the second piston.

The cylinder shaft 304a extends from the air cylinder 304 in the fourth axis $A_4$ negative direction, and is fixed on the fourth axis $A_4$ positive direction end surface of the motor housing 109. When the air pressure in the air cylinder 304 is raised by a compressor provided on the outside, the second piston is driven in the fourth axis $A_4$ negative direction. On the other hand, when the air pressure in the air cylinder 304 is lowered by the compressor, the second piston is driven in the fourth axis $A_4$ positive direction. The operation of the second piston is transmitted to the motor housing 109 via the cylinder shaft 304a.

A connection part housing 108 is supported on the block 306 so as to be movable along the fourth axis $A_4$. When the motor housing 109 is driven by the air cylinder 304, the connection part housing 108 and a shaft housing 110 are also integrally moved. In this way, the first hand arm 101 is moved by the air cylinder 304 along the fourth axis $A_4$. Therefore, in the present embodiment, the air cylinder 304 functions as a first driving unit configured to move a holding part 111 between the first distal position and the first proximal position.

According to the embodiment, the driving units of the first hand arm 101 and the second hand arm 102 are constituted by air cylinders. This makes it possible to manufacture the driving unit at a relatively low cost. Thus, the embodiment is advantageous in reducing the manufacturing cost of the robot hand.

Figure 9:
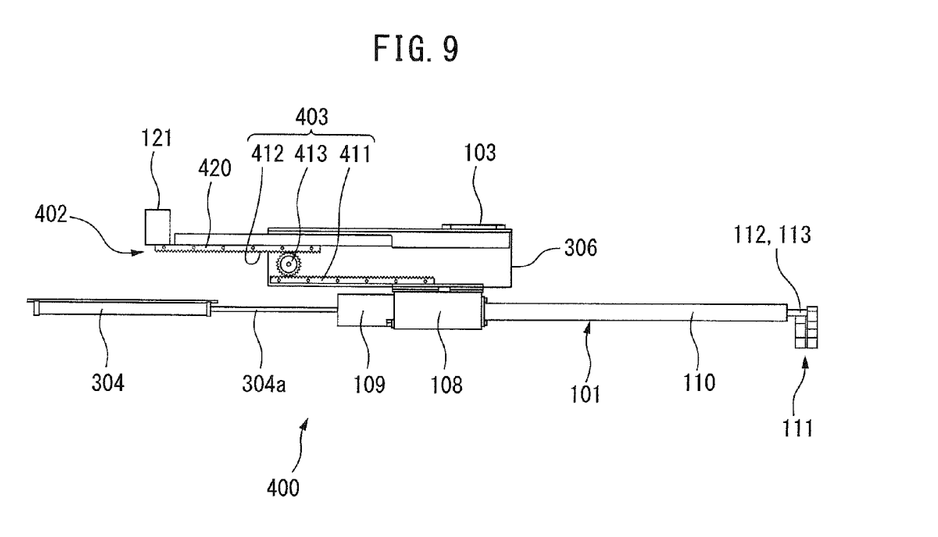
FIG. 9 is a side view of a robot hand according to still another embodiment of the present invention, and is a diagram illustrating a state that the robot hand is extended.

Next, a robot hand 400 according to still another embodiment of the present invention is described referring to FIG. 9. The elements similar to those in the foregoing embodiments are indicated with the same reference numerals, and a detailed description thereof is omitted herein. The robot hand 400 comprises a base 103; a first hand arm 101; an air cylinder 304; a second hand arm 402 mounted on the base 103 so as to be movable along the fourth axis $A_4$; and a link mechanism 403 configured to move the second hand arm 402 in association with movement of the first hand arm 101.

The second hand arm 402 includes an arm plate 420 extending along the fourth axis $A_4$; and a counter balancer weight 121 fixed on the arm plate 420. The arm plate 420 is mounted on a block 306 fixed on the base 103 so as to be movable along the fourth axis $A_4$. In the embodiment, an engaging part 412 is formed on the lower surface of the arm plate 420.

On the other hand, a connection part housing 108 of the first hand arm 101 is supported on the block 306 so as to be movable along the fourth axis $A_4$. An engaging member 411 is fixed on the upper surface of the connection part housing 108. The engaging member 411 is disposed in the block 306, and is moved together with the connection part housing 108.

A pinion 413 is interposed between the engaging part 412 of the arm plate 420, and the engaging member 411 fixed on the connection part housing 108. The pinion 413 is fixed on the block 306 to be rotatable in the block 306 around an axis orthogonal to FIG. 9. The pinion 413 engages both of the engaging part 412 of the arm plate 420 and the engaging member 411.

In the present embodiment, the link mechanism 403 configured to link the first hand arm 101 and the second hand arm 402 is constituted by the engaging part 412 of the arm plate 420, the engaging member 411, and the pinion 413.

Figure 10:
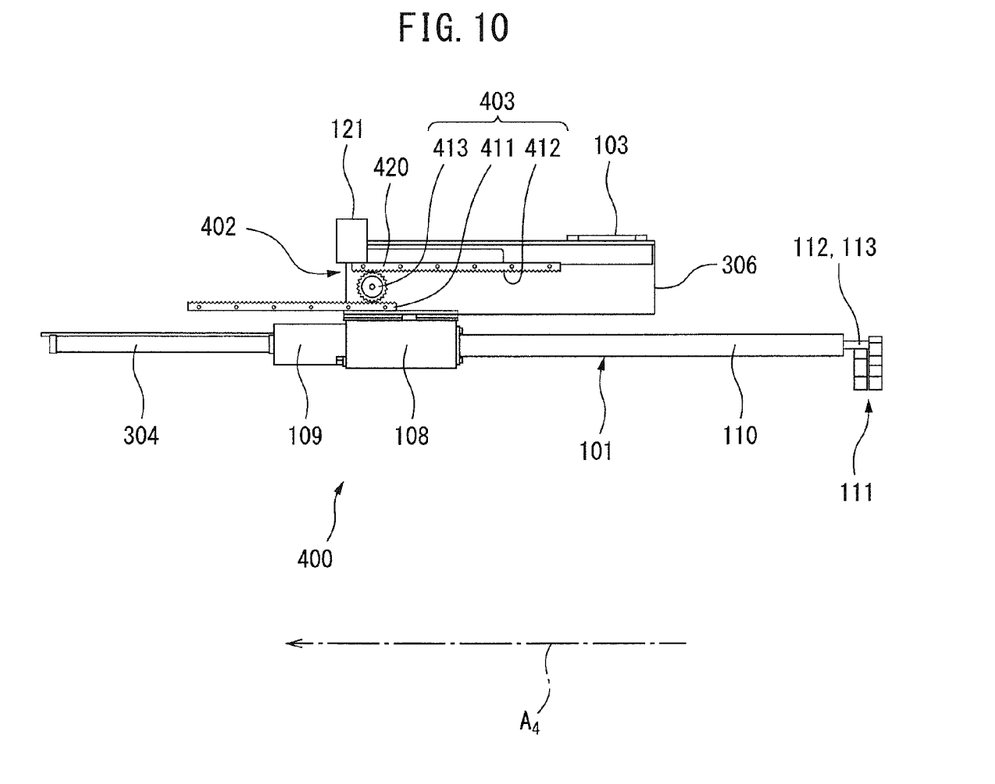
FIG. 10 is a diagram corresponding to FIG. 9, and is a diagram illustrating a state that the robot hand illustrated in FIG. 9 is contracted.

Next, an operation of the robot hand 400 according to the embodiment is described referring to FIG. 9 and FIG. 10. When the robot hand 400 is brought from a contracted state illustrated in FIG. 10 to an extended state illustrated in FIG. 9, the first hand arm 101 is moved in the fourth axis $A_4$ negative direction by the air cylinder 304. With this movement, the engaging member 411 fixed on the connection part housing 108 is also integrally moved in the fourth axis $A_4$ negative direction.

Then, the pinion 413 engaging the engaging member 411 is rotated counterclockwise as viewed from the front side of FIG. 10. When the pinion 413 is rotated counterclockwise in such a manner, the engaging part 412 of the arm plate 420 is driven in the fourth axis $A_4$ positive direction.

As a result, the arm plate 420, and the counter balancer weight 121 fixed on the arm plate 420 are integrally moved in the fourth axis $A_4$ positive direction. In other words, in the present embodiment, the pinion 413, and the engaging part 412 engaging the pinion 413 function as a second driving unit configured to drive the second hand arm 402.

In this way, in the embodiment, the link mechanism 403 makes it possible to move the counter balancer weight 121 in association with the movement of the holding part 111 by the air cylinder 304. According to this configuration, it is possible to drive both of the holding part 111 and the counter balancer weight 121 by one power source by sharing the power source (in this example, the air cylinder 304) between the first hand arm and the second hand arm.

According to this configuration, it is possible to reduce a power source requiring a complicated structure. Therefore, it is possible to reduce the manufacturing cost of the robot hand 400. Further, it is possible to securely synchronize the holding part 111 and the counter balancer weight 121 with each other with a simplified control.

In the foregoing embodiments, when the robot hand is brought to an extended state, while the holding part is moved in the fourth axis $A_4$ negative direction by the first hand arm, and the counter balancer weight is moved in the fourth axis $A_4$ positive direction, i.e., in the direction opposite to the moving direction of the holding part by the second hand arm.

However, in the aspect of reducing the moment applied on the robot arm at the time of transporting an article, moving the counter balancer weight at least toward the side opposite to the holding part with respect to the base makes it possible to obtain an effect of reducing the moment resulting from the article by the counter balancer weight. Therefore, the present invention is not limited to the foregoing embodiments, and may be configured such that the holding part is moved in the fourth axis $A_4$ negative direction, and the counter balancer weight is moved in any direction on the fourth axis $A_4$ positive direction side with respect to the base.

Further, in the foregoing embodiments, after the article is held by the holding part, the robot hand is temporarily brought to a contracted state to transport the article to a predetermined position. The present invention, however, is not limited to the above, and may be configured such that the article is transported to a predetermined position, while keeping the robot hand in an extended state.

Further, in the foregoing embodiments, a load sensor configured to measure the weight of an article to be transported is disposed between a shaft on which a holding part is fixed, and the holding part. The present invention, however, is not limited to the above. A load sensor may be mounted, for instance, on the base of the robot hand, or on the robot arm.

Further, for instance, bending sensors may be disposed at plural positions on the robot arm, in place of a load sensor so that the controller detects distortion of the robot arm generated when the holding part holds an article. Then, the controller may calculate the moment applied on the robot arm, based on distortion information transmitted from the bending sensors. In the above configuration, the controller may periodically receive distortion information from the bending sensors, and may adjust the position of the counter balancer weight on the real time basis in accordance with the moment applied on the robot arm, which changes every minute during transportation.

As described above, according to the robot hand of the present invention, it is possible to reduce the load moment applied on the base and on the wrist when an article is lifted by the holding part disposed at a position away from the base, by the counter balancer weight. Further, it is possible to move both of the holding part and the counter balancer weight to the proximal positions. This makes it possible to reduce the load inertia applied on the robot arm when an article held on the holding part is transported by an operation of the robot arm.

The present invention has been described by way of the embodiments of the invention. The foregoing embodiments, however, do not limit the invention defined in the claims. Further, all the combinations of the features described in the embodiments may not be essential as solution means in the invention. Further, it is obvious to those skilled in the art to add a variety of modifications or improvements to the embodiments. It is obvious that such modifications or improvements are also included in the technical scope of the present invention, from definition in the claims of the present invention.

Further, note that the order of execution of the processes such as operations, procedures, steps, and stages in the device, the system, and the method described in the claims, the specification, and the drawings is not particularly clearly mentioned such as "preceding to" or "prior to". Further, unless the output of a preceding process is used for a succeeding process, the processes may be implemented in any order. Regarding the operation flow in the claims, the specification, and the drawings, the expression such as "first of all" or "next" does not mean that it is essential to carry out the processes in this order.

The invention claimed is:

1. A method of controlling a robot hand, the robot hand including:
   a base;
   a first hand arm mounted on the base to be reciprocable on a first track parallel to a first axis, the first hand arm including a holding part configured to hold an article, and the first hand arm configured to move the holding part between (i) a first distal position away from the base in a first direction and (ii) a first proximal position closer to the base than the first distal position; and
   a second hand arm mounted on the base to be reciprocable on a second track parallel to the first axis, the second hand arm including a counter balancer weight, and the second hand arm configured to move the counter balancer weight between (a) a second distal position away from the base in a second direction opposite to the first direction and (b) a second proximal position closer to the base than the second distal position, wherein the first track and the second track are separate away from each other in a direction intersecting the first axis, the method comprising:

moving the counter balancer weight from the second proximal position to the second distal position by the second hand arm;

moving the holding part from the first proximal position to the first distal position by the first hand arm, wherein the holding part is moved from the first proximal position to the first distal position by the first hand arm after the counter balancer weight is moved from the second proximal position to the second distal position by the second hand arm; and holding the article by driving the holding part.

2. The method according to claim 1, further comprising:

measuring a weight of the article, after said holding the article;

calculating an arrangement position at which the counter balancer weight is to be arranged, based on the measured weight of the article; and moving the counter balancer weight to the arrangement position by the second hand arm.

3. A robot system, comprising:

a robot hand configured to hold and transport an article, the robot hand comprising:

a base;

a first hand arm mounted on the base, the first hand arm including a holding part configured to hold the article, and the first hand arm configured to move the holding part between (i) a first distal position away from the base in a first direction, and (ii) a first proximal position closer to the base than the first distal position;

a second hand arm mounted on the base, the second hand arm including a counter balancer weight, the second hand arm configured to move the counter balancer weight between (a) a second distal position away from the base in a second direction opposite to the first direction, and (b) a second proximal position closer to the base than the second distal position;

a first driving unit configured to drive the holding part to move between the first distal position and the first proximal position; and a second driving unit configured to drive the counter balancer weight to move between the second distal position and the second proximal position; and a controller configured to control the first driving unit and the first driving unit, wherein the controller is configured to control the first driving unit to move the holding part from the first proximal position to the first distal position, after controlling the second driving unit to move the counter balancer weight from the second proximal position to the second distal position.

4. The robot system according to claim 3, wherein each of the first driving unit and the second driving unit includes an air cylinder.

5. The robot system according to claim 3, wherein each of the first driving unit and the second driving unit includes a servo motor.

6. The robot system according to claim 3, wherein one of the first driving unit and the second driving unit includes a servo motor, and the other of the first driving unit and the second driving unit includes an air cylinder.

7. The robot system according to claim 3, further comprising:

a robot arm to which the robot hand is mounted.

8. The robot system according to claim 3, further comprising:

a load sensor, wherein the load sensor is configured to measure a weight of the article, and the controller is configured to control movement of the counter balancer weight by the second hand arm, based on the weight of the article measured by the load sensor.

* * * * *